No. 873,141. PATENTED DEC. 10, 1907.
A. W. WALKER.
DAMPER.
APPLICATION FILED JUNE 18, 1906.

Witnesses:
Fred S. Greenleaf
W. L. Friary

Inventor.
Arthur W. Walker,
by Crosby Gregory
attys.

THE NORRIS PETERS CO., WASHINGTON, D. C.

UNITED STATES PATENT OFFICE.

ARTHUR W. WALKER, OF MALDEN, MASSACHUSETTS.

DAMPER.

No. 873,141.  Specification of Letters Patent.  Patented Dec. 10, 1907.

Application filed June 18, 1906. Serial No. 322,141.

*To all whom it may concern:*

Be it known that I, ARTHUR W. WALKER, a citizen of the United States, residing in Malden, county of Middlesex, State of Massachusetts, have invented an Improvement in Dampers, of which the following description, in connection with the accompanying drawing, is a specification, like letters on the drawings representing like parts.

This invention has for its object the production of a novel and simple damper for use in connection with heaters, furnaces, stoves or the like.

In accordance with my invention I have provided a pipe damper with hollow journals having openings that, when the damper is closed, register with openings in bearings in which said journals are mounted to turn, said openings supplying air to the pipe and usual chimney, whereas when said damper is open, and draft is needed to insure combustion, the openings of the journals are closed by portions of the bearings.

The bearings, as I have herein illustrated my invention, are extended from and form part of a pipe collar, and the hollow journals have openings in their sides, but this may be varied without departing from my invention.

Figure 1:
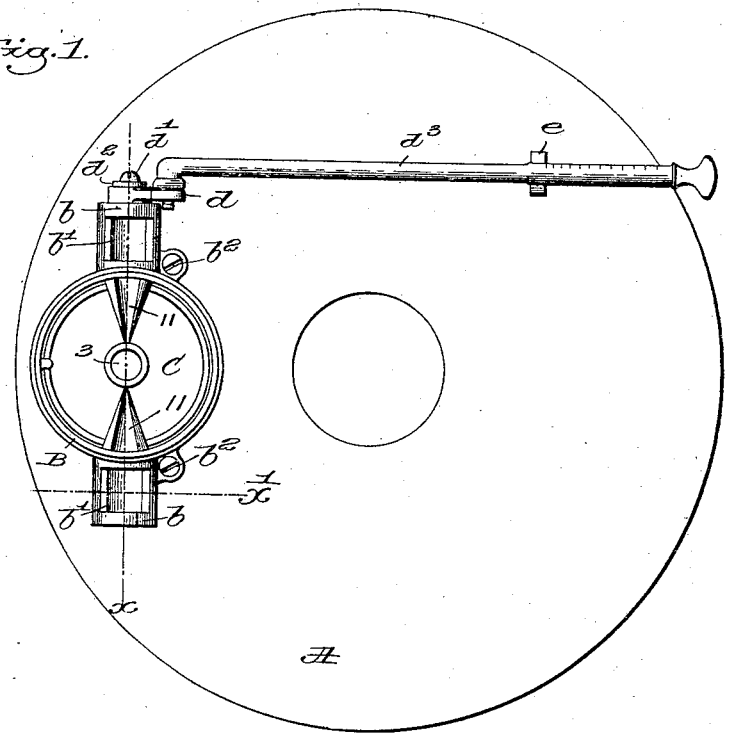
Figure 2:
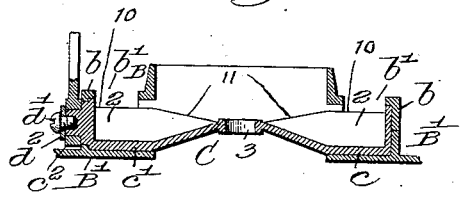
Figure 3:
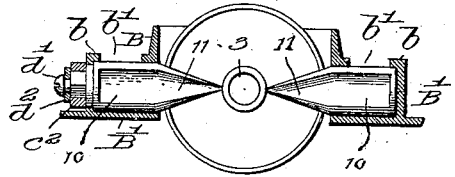
Figure 4:
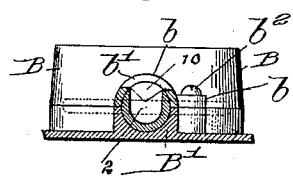
Figure 5:
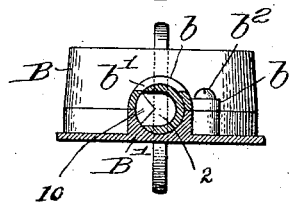

Figure 1 is a plan view of a furnace provided with a pipe collar and damper made in accordance with my invention; Fig. 2 is a section in the line $x$, Fig. 1, the damper being closed; Fig. 3 is a like section with the damper open; Fig. 4 is a section in the line $x'$ showing the damper closed; and Fig. 5 is a section in the line $x'$ showing the damper open.

In the drawings A represents the top of a heater, furnace or stove which has an opening therein communicating with the smoke pipe. Supported on the top of the furnace is a pipe collar B to which the smoke pipe is secured in usual manner. Within the pipe collar is situated a damper C which has a central opening 3 for the discharge of gas rising from the coal when the damper is closed.

The damper C is provided with two journals $c, c'$, which are rotatably mounted in bearings B' that are formed integrally with the pipe collar and are secured to the top of the furnace in any suitable way. The journals $c, c'$, are hollow and are closed at their ends, said journals being made with radial or side air inlet passages or ports 10 which communicate with the interior 2 of the journals, the inner end of said journals being open at 11 to the space within the pipe collar. The bearings B' are preferably made with caps $b$ which are held in place by means of suitable screws $b^2$, and each bearing is provided with the radial or side air inlet $b'$.

The outer end of the journal $c$ abuts the inner side of the bearing in which it turns, while the end of the journal $c'$ extended through the end wall of the bearing in which it is mounted to be turned is, as shown, shaped to be embraced by a crank arm $d$ held thereon by a screw $d'$ and washer $d^2$, a link $d^3$ shown as attached to said crank arm being engaged with a notch of a projection $e$ on the top A to thereby retain the damper in any position desired.

When the damper is open, as shown in Figs. 3 and 5, the products of combustion rising from the fuel in the usual fire box of the heater, furnace, or stove, will pass upwardly through the pipe collar, and the solid parts or caps of the journals close the openings $b'$. When it is desired to check or substantially stop the draft, the damper will be turned into the position shown in Figs. 1, 2 and 4, placing the openings 2 of the journals in communication with the openings $b'$ of the caps, and immediately air enters the openings $b'$, passes through the journals above the top of the damper and up out of the pipe collar into the usual pipe surrounding the same, and thence into the chimney.

I have shown both journals and their bearings adapted to act as air inlets when the damper is closed, but my invention may be applied to but one journal and bearing.

Having fully described my invention, what I claim as new and desire to secure by Letters Patent is:—

1. In an apparatus of the class described, the combination with a pipe-collar, and a pivoted damper therein having a hollow journal open at its end adjacent the damper and provided with an air inlet port in its side, of a bearing in which said journal is rotatably mounted, said bearing having a port arranged in its side whereby the turning of the damper into closed position brings the two ports into register with each other and into communication with the interior of the pipe-collar, while the turning of the damper into open position closes said ports.

2. In an apparatus of the class described, the combination with a pipe collar, of a damper pivotally mounted therein and having hollow journals each provided with an air inlet port in its side and with another port leading to the interior of the pipe collar, bearings for said journals rigid with the pipe collar, each bearing having an air inlet port in its side adapted to register with the air inlet port in the journal when the damper is closed and to be out of register therewith when the damper is open.

In testimony whereof, I have signed my name to this specification, in the presence of two subscribing witnesses.

ARTHUR W. WALKER.

Witnesses:
GEO. W. GREGORY,
MARGARET A. DUNN.